COINCIDENT CURRENT READOUT DIGITAL STORAGE MATRIX

Filed Dec. 31, 1963

INVENTOR.
ROBERT E. THOME

BY
Sughrue, Rothwell, Mion & Zinn
ATTORNEYS

United States Patent Office 3,293,626
Patented Dec. 20, 1966

3,293,626

COINCIDENT CURRENT READOUT DIGITAL STORAGE MATRIX

Robert E. Thome, Poughkeepsie, N.Y., assignor to International Business Machines Corporation, New York, N.Y., a corporation of New York Filed Dec. 31, 1963, Ser. No. 334,713
9 Claims. (Cl. 340—174)

Figure 1:
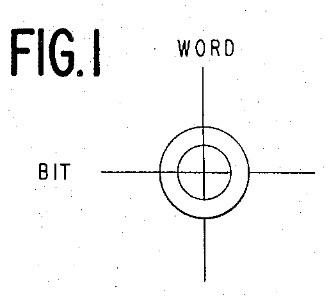

This invention relates to a digital storage device and more particularly to a two wire per core magnetic core matrix in which one of said wires functions as a combined select sense wire.

It has been proposed to provide each core in a magnetic memory matrix with at least three wires, two for coordinate half select switching currents and a third wire to function as a sense line. Due to the fact that the cost of the core array increases substantially relative to the cost of the drivers and peripheral circuitry as the array increases in size, the most fruitful efforts towards economy reside in the area of the array itself. Additionally, it is necessary to keep the array at minimum physical dimensions. To do this, cores are now being made of smaller and smaller size. The smaller the core, the more difficult becomes the threading problem. To achieve both economy and ease of threading, the present invention proposes to eliminate the usual separate sense winding and to employ one of the select windings for a dual function, that is, providing half select current as well as accommodating the sensing function.

In another type of conventional two-dimensional matrix the coordinate wires are threaded through the cores so that each core has only two wires extending through it and on writing into the matrix a core is switched from 0 state to 1 state by passing half select currents through the wires which cross at that core; then on read out one of the two wires receives full select current to switch the core back to the 0 state, while the other wire serves as a sense winding. A disadvantage of this prior art device is that it requires a relatively complex addressing means.

In contrast with this technique the invention reads out a core by applying half select currents to the two coordinate wires which meet at that core and detecting, in a sense amplifier, the current pulse which occurs in one of the wires (the sense line) when the core switches. This entails the problem that the much larger half select driving pulse which passes through the sense amplifier tends to obscure the more feeble information output pulse. The problem is overcome, in accordance with the invention, by nullifying the effect of the half select currents on the sense amplifier, leaving the information output pulse distinctly recognizable. For example, in an illustrative embodiment of the invention a plurality of lines on one axis of a core matrix, having both half select and sense functions, are coupled to a pair of primary windings of a sensing transformer in a balanced, bucking relation, so that the half select drive currents nullify each other in the transformer; while the coordinate drive lines on the other axis of the matrix are threaded through the cores so that such a drive line never drives two cores on two different sense lines coupled to bucking primary windings of the sensing transformer. Thus, the sensing transformer always senses the difference between the signal outputs on the two different sense lines.

A feature of the present invention, which distinguishes it from the prior art, is that a half select pulse and a signal pulse appear on the same line at the same time.

It is an object of this invention to provide a system for reading out data stored in a core memory array in which system an economy of size and cost is achieved with respect to the array.

More specifically this object is obtained by providing means to employ one of the read select coordinate wires as a combined read select and sense line, whereby cost reduction is achieved as well as optimization of the threading problems attendant on the use of extremely small cores.

These and other objects are realized, in an illustrative embodiment of the invention, wherein, speaking functionally, each bit position comprises two rows of cores threaded by wires constituting parallel branches of a half select drive circuit. Each word position is a column identified with a half select drive wire which threads the core of only one bit position from each pair of rows. The wires of one row of each pair of rows are connected in common to a first primary winding of a sensing transformer, while the wires of the other row of each pair are connected in common to a second primary winding of the sensing transformer. The first and second primary windings are polarized so as to generate, in response to half select pulses, fields of opposite polarities, which balance out. If half select word and bit pulses coinciding at any core find the core in the 1 state, the core is switched to the 0 state and produces a current pulse in its row wire (sense line) and the respective primary winding. The same pulse returns through the other primary winding as a current pulse of opposite sense, thus the transformer senses the difference and produces an information output signal.

A feature of the invention is that a brief delay in applying the second half select current allows time for transients to settle, in the wire which is to serve as the sense wire, before the definitive pulse appears thereon.

In FIG. 1 a typical toroidal two state core is represented, threaded by a bit wire and a word wire corresponding in general to the conventional X and Y coordinates.

Figure 2:
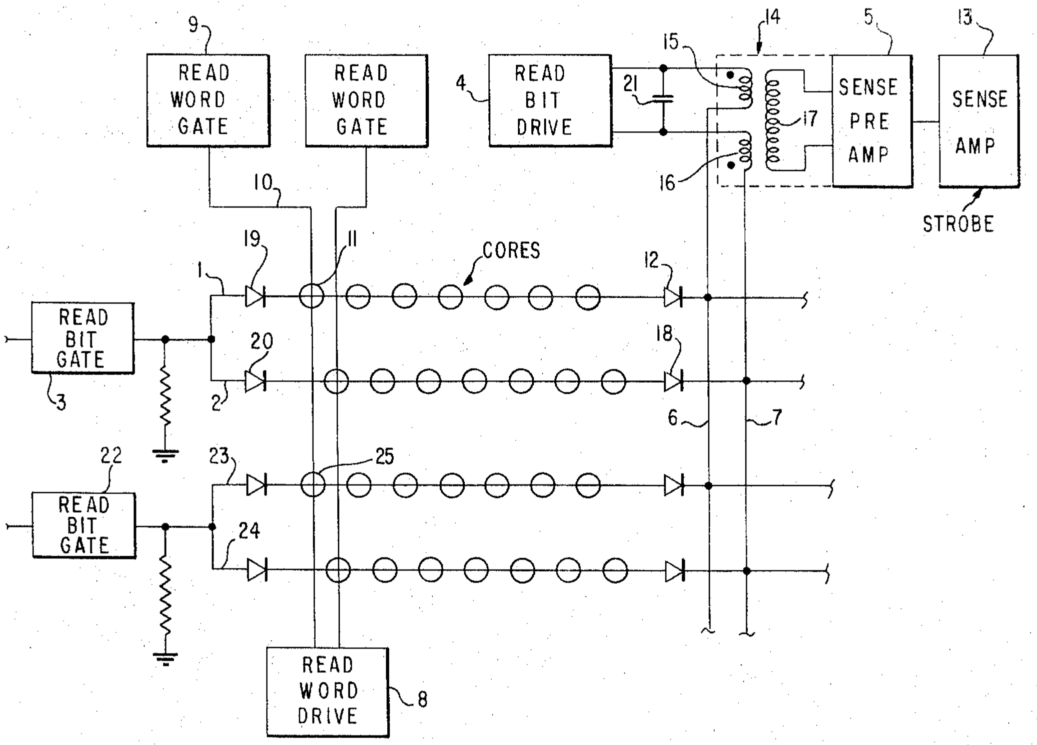

In FIG. 2 a plurality of these cores are arranged in a matrix. While there may be any number of rows and columns in the array, for simplicity a matrix of two pairs of rows and fourteen columns is shown. There is one read bit gate, such as 3, for each pair of rows and one read bit driver 4 for supplying half select currents to all of the rows. Beginning at the top of the matrix, each odd row of cores is threaded by a wire, such as 1, connected to a common wire 6 serving all of the odd rows. The wire 6 leads to a primary winding 15 of a transformer 14 forming part of a sense preamplifier 5, the other end of this winding being connected to the read bit driver 4. Each even row of cores is threaded by wire, such as 2, connected to a common wire 7. The wire 7 is connected to a second winding 16 of the transformer, which is also connected at its other end to the read bit driver 4. The windings 15 and 16 are connected in difference mode, to establish a bucking relation in response to half select currents in them. The leads from the driver 4 are coupled by a capacitor 21. Each of the lines 1 and 2 includes two diodes: 12, 19 and 18, 20, which are forward biased when the lines are driven by a half select pulse, but at other times serve to isolate the lines from extraneously originating pulses.

For each column there is a wire such as 10, extending from a read word driver 8 to a corresponding read word gate, such as 9. Starting from the left of the diagram, the odd column wires 10 pass through cores in the odd rows, while the even wires pass through cores in the even rows. Thus, a half select column pulse can only coincide with a half select row pulse in either an odd row or an even row, but never in both rows of a pair.

Figure 3:
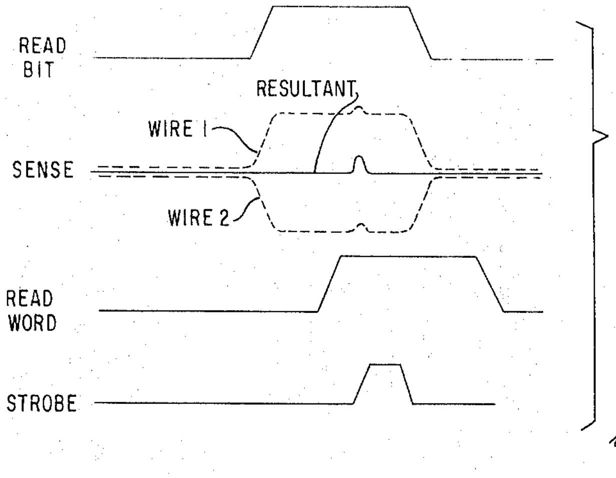

Referring now to FIG. 3, the upper curve represents a read bit gate signal applied to any pair of row wires 1 and 2. The third curve is a read word gate signal applied to any column wire. The read bit gate signal precedes the read word gate signal, but the two are coincident for a certain length of time. It is during this coincident time that a core at the point of intersection of one row wire of the gated pair and the gated column wire is subjected to a full select pulse, which switches it from 1 to 0, if it had been in the 1 state initially. Suppose the core 11 is switched and bear in mind that when this occurs the diodes 12, 19, 18 and 20 are in a forward biased state, due to the half select pulse in wires 1 and 2 as represented by the top and bottom curves in the second line of FIG. 3. The opposite phase of these pulses signifies their effect in transformer 14. The middle curve of the second line of the diagram, represents the resultant current signal in the secondary winding 17, which is zero where the fields produced by the currents in the primary windings are equal and opposed. The switching of the core 11 produces a current pulse in the following loop: from left to right in wire 1, up through winding 15, through condenser 21, down through winding 16, from right to left through wire 2 (the diodes 18 and 20 being forward biased) back to the junction with wire 1. The small pulses in wires 1 and 2 are in phase and the field changes at windings 15 and 16 add, to produce a resultant current pulse in secondary winding 17 proportional to their sum. Thus, the sense preamplifier 5 senses the algebraic difference of the pulses in wires 1 and 2. The fourth line of FIG. 3 shows a strobe pulse applied in the sense amplifier 13 at the time when any pulse would appear in the sense preamplifier 5, due to a difference in currents in any pair of wires 1 and 2.

It has been mentioned that the read bit gate signal precede the word bit gate signal. This has the purpose of allowing any transients on the row wires and windings 15 and 16 to settle out, before the read word gate signal is applied to subject the core being read to a full select pulse. Thus, noise is reduced to a minimum at strobe time.

It will be noted that when read bit gate 3 is addressed, the remainder of the read bit gates 22 connected to the same sense amplifier 13 are not addressed. Consequently, the cores associated with lines 1 and 2 are half selected but those associated with lines 23 and 24 are not. The addressing of read word gate 9 half selects not only core 11 but also additional core 25 associated with line 10. However, it should be noted that while the cores associated with line 10 are half selected, only one of them, namely core 11, is also half selected by the addressed bit gate. Therefore, the read bit gate half selects a pair of rows and the read word gate half selects a plurality of cores in the matrix, one for each pair of rows, only one core of which is common to the pair of rows selected by the read bit gate.

The invention has been illustrated in simple form, but it is contemplated that it has applicability to a large core matrix, for example a three dimensional matrix. For the purpose of the specification and claims it may be considered that the illustration of FIG. 2 involves words having one bit therein. By simple expansion in a third dimension the words may have a bit content of a plurality of bits.

What has been shown and described is one embodiment of the invention. Other embodiments obvious from the readings herein are contemplated to be within the spirit and scope of the following claims.

What is claimed is:

1. A digital storage device comprising a core matrix divided into data words and data bits comprising said words, each of said words including at least one bit, first means including first and second windings to provide half select pulses to cores representing data bits in a first and second plurality of words on first and second windings respectively, second means operating at least partially coincidentally with said first means to provide half select pulses to at least one core representing a bit of one of the words in said first and second plurality of words, whereby said one word is selected, coupling means having two inputs and an output, and means for connecting said half select pulses on said first and second winding to said two inputs, respectively, in a cancelling relationship and for connecting a signal caused by the switching of a selected core to said inputs in a non-cancelling relationship.

2. A digital storage device as described in claim 1, wherein there is a substantial delay between the beginning of operation of said first means and the beginning of operation of said second means.

3. A digital storage device as claimed in claim 1 wherein said first means comprises a read gate and a read driver.

4. A digital storage device as claimed in claim 3 wherein said read gate, said read driver, said first winding and one of said two inputs are connected in series, and said read gate, said read driver, said second winding and the other of said two inputs are connected in series.

5. A digital storage device as claimed in claim 4 wherein said coupling means is a transformer and said two inputs are first and second portions of the primary coil of said transformer.

6. A digital storage device comprising a core matrix divided into data words and data bits comprising said words, each of said words including at least one bit, first means to provide half select pulses to the cores representing the data bits in a first and second plurality of words, said first means including a bit drive means for supplying half select current simultaneously to the cores pertaining to said first and second plurality of words and means to address said first and second plurality of words, said first means further comprising first and second bit windings, second means operating at least partially coincidentally with said first means to provide half select pulses to at least one core pertaining to one of the words in said first and second plurality of words, said second means including a word drive means for supplying half select current to the cores representing a third plurality of words, only one of said third plurality including a word common to either said first or second pluralities, and means to address said third plurality, whereby said one word is selected, coupling means having two inputs and an output, and means for connecting said half select pulses on said first and second winding to said two inputs, respectively, in a cancelling relationship and for connecting a signal caused by the switching of a selected core to said inputs in a non-cancelling relationship.

7. A digital storage device as claimed in claim 6 wherein said coupling means comprises a transformer, said two inputs are first and second portions of the primary coil of said transformer and said output is the secondary coil of said transformer.

8. A digital storage device as claimed in claim 7 further comprising means for amplifying the signal induced in said secondary coil by said first and second portions and means to strobe said amplified signal simultaneously with the provision of half select pulses.

9. A digital storage device comprising, a core matrix divided into data words and data bits comprising said words, a plurality of pairs of drive lines, each line threading cores of a unique plurality of words, bit drive means for supplying half select read currents to each line of a selected pair, means operable a substantial delay after the beginning of a read half select current on a selected drive line pair to supply a half select read current to one core on each of said drive line pairs, whereby at least one core of one word is selected, coupling means having two inputs and an output, and means for connecting said half select pulses on said selected pair of lines to said two inputs, respectively, in a cancelling relationship and for connecting a signal caused by the switching of a selected core to said inputs in a non-cancelling relationship.

References Cited by the Examiner

UNITED STATES PATENTS

| | | | |
|---|---|---|---|
| 2,911,631 | 11/1959 | Warren | 340—174 |
| 2,988,732 | 6/1961 | Vinal | 340—174 |
| 3,003,139 | 10/1961 | Perkins | 340—174 |
| 3,142,049 | 7/1964 | Crawford | 340—174 |
| 3,144,641 | 8/1964 | Raffel | 340—174 |
| 3,181,131 | 4/1965 | Pryor et al. | 340—174 |
| 3,181,132 | 4/1965 | Amemiya | 340—174 |
| 3,209,337 | 9/1965 | Crawford | 340—174 |

BERNARD KONICK, *Primary Examiner.*

IRVING SRAGOW, *Examiner.*

S. M. URYNOWICZ, *Assistant Examiner.*